United States Patent [19]

Eichenauer et al.

[11] Patent Number: 5,741,853
[45] Date of Patent: Apr. 21, 1998

[54] ABS MOULDING COMPOSITIONS WITH IMPROVED PROPERTIES

[75] Inventors: Herbert Eichenauer; Ulrich Jansen, both of Dormagen; Karl-Erwin Piejko, Bergisch Gladbach; Edgar Leitz, Dormagen, all of Germany

[73] Assignee: Bayer AG, Leverkusen, Germany

[21] Appl. No.: 651,454

[22] Filed: May 22, 1996

[30] Foreign Application Priority Data

Jun. 2, 1995 [DE] Germany ............ 195 20 286.4

[51] Int. Cl.$^6$ ............ C08L 55/02; C08L 25/12
[52] U.S. Cl. ............ 525/71; 525/73; 525/84; 525/86
[58] Field of Search ............ 525/71, 86, 73, 525/84

[56] References Cited

U.S. PATENT DOCUMENTS

| | | | |
|---|---|---|---|
| 3,170,964 | 2/1965 | Grabowski | 260/876 |
| 3,509,238 | 4/1970 | Aubrey et al. | 260/876 |
| 3,576,910 | 4/1971 | Jastrzebski . | |
| 3,928,494 | 12/1975 | Aliberti | 260/876 |
| 4,520,165 | 5/1985 | Zabrocki et al. | 525/84 |
| 4,767,833 | 8/1988 | Yumoto | 525/71 |
| 5,674,940 | 10/1997 | Eichenauer | 525/86 |

FOREIGN PATENT DOCUMENTS

| | | | |
|---|---|---|---|
| 0 678 531 | 10/1995 | European Pat. Off. . | |
| 034111 | 2/1982 | Japan . | |
| 252451 | 11/1987 | Japan | 525/71 |
| 1 139 588 | 1/1969 | United Kingdom . | |
| 1 235 346 | 6/1971 | United Kingdom . | |
| 1349235 | 4/1974 | United Kingdom | 525/71 |

OTHER PUBLICATIONS

Orbit Abstract of EP 0 678 531 (Oct. 25, 1995).
Database WPI, Section Ch, Week 7947, Derwent Publications Ltd., London, GB, Class A18, abstract of JP-A-54 133 588 (Japan Synthetic Rubber), Oct. 17, 1979.
Database WPI, Section Ch, Week 7019, Derwent Publications Ltd., London, GB, Class A13, abstract of DD-A-71 615 (Schnabel H Hamann B Gruno), May, 1970.

*Primary Examiner*—David Buttner
*Attorney, Agent, or Firm*—Connolly & Hutz

[57] ABSTRACT

Thermoplastic moulding compositions of the ABS type of
I) at least one graft copolymer which is obtainable by emulsion polymerization of styrene and acrylonitrile in the weight ratio 90:10 to 50:50, wherein styrene and/or acrylonitrile can be completely or partly replaced by α-methylstyrene, methyl methacrylate or N-phenylmaleimide, in the presence of at least two butadiene polymer latices of types (A) and (B), which each contain, copolymerized, 0 to 50 wt. % of a further vinyl monomer, and wherein the weight ratio of monomers used to butadiene polymers used is 25:75 to 70:30, and
II) at least one copolymer of styrene and acrylonitrile in the weight ratio 90:10 to 50:50, wherein styrene and/or acrylonitrile can be completely or partly replaced by α-methylstyrene, methyl methacrylate or N-phenylmaleimide, characterized in that the butadiene polymer latex (A) has a particle diameter $d_{50} \leq 320$ nm, a width of the particle size distribution (measured as $d_{90}-d_{10}$ from the integral particle size distribution) of 30 to 100 nm, and a gel content $\leq 70$ wt. % and the butadiene polymer latex (B) has a particle diameter $d_{50} \geq 370$ nm, a width of the particle size distribution (measured as $d_{90}-d_{10}$ from the integral particle size distribution) of 50 to 500 nm and a gel content $\geq 70$ wt. %.

13 Claims, No Drawings

ABS MOULDING COMPOSITIONS WITH IMPROVED PROPERTIES

The invention relates to thermoplastic moulding compositions of the ABS type with improved properties compared with known ABS moulding compositions, in particular a combination of high toughness, good processibility and very good surface quality (gloss, perceived colour).

ABS moulding compositions are two-phase plastics of:

I. a thermoplastic copolymer of styrene and acrylonitrile in which the styrene can be wholly or partly replaced by α-methylstyrene or methyl methacrylate; this copolymer, also known as SAN resin or matrix resin, forms the external phase;

II. at least one graft polymer which has been produced by grafting reaction of one or more of the monomers named under I onto butadiene homo- or copolymer ("graft backbone"). This graft polymer ("elastomer phase" or "graft rubber") forms the disperse phase in the matrix resin.

For a given matrix the toughness of an ABS moulding composition is determined substantially by the graft rubber. The toughness achievable with conventional ABS moulding compositions is not yet sufficient with the required reliability for highly stressed moulded parts, or else high toughness values are achieved at the expense of other properties, such as surface quality of the moulded parts.

There is therefore a requirement for graft rubbers, on the basis of which ABS moulding compositions with increased toughness can be produced without a deterioration of the other properties, in particular gloss and uniformity of the perceived colour (no intensification of colour behind ribs in the case of coloured moulded parts with ribbed structures, i.e. no visual impression of an uneven colouring).

It has now been found that in the use of a special mixture of at least two precisely defined rubber latices and preferably by the simultaneous application of special reaction conditions during the graft rubber production ABS moulding compositions are obtained that simultaneously have high values for the toughness and a very good surface quality, especially a high gloss and no colour intensification.

The use of rubber latex blends in the manufacture of graft rubbers for ABS moulding compositions is certainly known, but the required quality is not achieved.

Thus tough, well processible ABS moulding compositions are known e.g. from DE-AS 1 813 719, which are obtained by one-stage graft polymerization under pressure of 75 to 90 parts wt. (parts by weight) of a monomer mixture onto 10 to 25 parts wt. of a mixture of two rubber latices, whereof one is a pure polybutadiene and the other an SBR latex with a styrene content<50% and a certain particle size.

U.S. Pat. No. 3,509,238 describes ABS products which are produced with the use of two graft polymers, whereof one is weakly and the other strongly grafted. However, these products have inadequate properties at low temperatures.

In U.S. Pat. No. 3,928,494 ABS products are described with two graft polymers of different grafting strength, in which the more weakly grafted finely-divided material congregates on spray drying or coagulation to particle aggregates. Such aggregates are loosely bound structures, which are broken up again at high temperatures and shear forces, as can occur for example in injection moulding processing and then lead to inadequate product toughnesses.

In EP-A 116 330 ABS moulding compositions are described, based on two different butadiene polymers with a special grafting point distance of the graft polymers produced from the butadiene polymers. These products certainly have a good toughness at room temperature, but the values for low-temperature toughness and surface gloss are inadequate for high requirements.

The invention provides thermoplastic moulding compositions of the ABS type of

I) at least one graft copolymer which is obtainable by emulsion polymerization of styrene and acrylonitrile in the weight ratio 90:10 to 50:50, wherein styrene and/or acrylonitrile can be completely or partly replaced by α-methylstyrene, methyl methacrylate or N-phenylmaleimide, in the presence of at least two butadiene polymer latices of types (A) and (B), which each contain 0 to 50 wt. % of a further copolymerized vinyl monomer, and wherein the weight ratio of monomers used to butadiene polymers used is 25:75 to 70:30, and II) at least one copolymer of styrene and acrylonitrile in the weight ratio 90:10 to 50:50, wherein the styrene and/or acrylonitrile can be completely or partly replaced by α-methylstyrene, methyl methacrylate or N-phenylmaleimide, characterized in that the butadiene polymer latex (A) has a particle diameter $d_{50} \leq 320$ nm, preferably 260 to 310 nm, a width of the particle size distribution (measured as $d_{90}-d_{10}$ from the integral particle size distribution) of 30 to 100 nm, preferably of 40 to 80 nm, and a gel content $\leq 70$ wt. %, preferably 40 to 65 wt. % and the butadiene polymer latex (B) has a particle diameter $d_{50} \geq 370$ nm, preferably 380 to 450 nm, a width of the particle size distribution (measured as $d_{90}-d_{10}$ from the integral particle size distribution) of 50 to 500 nm, preferably of 100 to 400 nm, and a gel content $\geq 70$ wt. %, preferably 75 to 90 wt. %. The graft polymerization is preferably carried out by monomer feed to the mixture of the butadiene polymer latices (A) and (B) in such a way that within the first half of the monomer feed time 55 to 90 wt. %, preferably 60 to 80 wt. %, particularly preferably 65 to 75 wt. % of the monomers are charged.

The moulding compositions according to the invention can also contain other rubber-free thermoplastic resins, not composed of vinyl monomers.

During the graft polymerization a mixture of at least two butadiene polymer latices, one each of type (A) and type (B), are used. The weight ratio (A):(B), based on the particular solids component of the latices, amounts to preferably 90:10 to 10:90, particularly preferably 60:40 to 30:70.

The butadiene polymer latices (A) and (B) can be produced by emulsion polymerization of butadiene. This polymerization is known and described e.g. in Houben-Weyl, Methoden der organischen Chemie, Makromolekulare Stoffe, Part 1, p. 674 (1961), Thieme Verlag Stuttgart. Up to 50 wt. % (based on the total amount of monomer used for the production of butadiene polymer) of one or more monomers copolymerizable with butadiene can be used as comonomers.

Examples of such monomers are isoprene, chloroprene, acrylonitrile, styrene, α-methylstyrene, $C_1-C_4$ alkylstyrenes, $C_1-C_8$ alkyl acrylates, $C_1-C_8$ alkyl methacrylates, alkylene glycol diacrylates, alkylene glycol dimethacrylates, divinylbenzene; preferably butadiene alone is used. It is also possible first to produce a finely-divided butadiene polymer by known methods and thereafter to agglomerate it in known manner to establish the required particle size.

Relevant techniques are described (compare EP-PS 0 029 613; EP-PS 0 007 810; DD-PS 144 415 DE-AS 1 233 131; DE-AS 1 258 076; DE-OS 2 101 650; U.S. Pat. No. 1,379,391).

The so-called seed polymerization technique likewise can be used, according to which at first a finely divided butadiene polymer is produced and then by further conversion with butadiene-containing monomers further polymerized to larger particles.

In principle the butadiene polymer latices (A) and (B) can also be produced by emulsification of finely-divided butadiene polymers in aqueous media (cf. Japanese Patent Application 55.125.102).

The butadiene polymer latex (A) has a mean particle diameter $d_{50} \leq 320$ nm, preferably 260 to 310 nm, a width of the particle size distribution (measured as $d_{90}$–$d_{10}$ from the integral particle size distribution) of 30 to 100 nm, preferably of 40 to 80 nm, and a gel content $\leq 70$ wt. %, preferably 40 to 65 wt. %.

The butadiene polymer latex (B) has a mean particle diameter $d_{50} \geq 370$ nm, preferably 380 to 450 nm, a width of the particle size distribution (measured as $d_{90}$–$d_{10}$ from the integral particle size distribution) of 50 to 500 nm, preferably of 100 to 400 nm, and a gel content $\geq 70$ wt. %, preferably 75 to 90 wt. %.

The mean particle diameter $d_{50}$ as well as the $d_{10}$ and $d_{90}$ values can be determined by ultracentrifuge measurement (cf. W. Scholtan. H. Lange: Kolloid Z. and Z. Polymere 250. p. 782 to 796 (1972)) and the values quoted for the gel content refer to the determination by the wire-cage method in toluene (cf. Houben-Weyl, Methoden der Organischen Chemie, Makromolekulare Stoffe, Part 1, p. 307 (1961). Thieme Verlag Stuttgart).

The gel contents of the butadiene polymer latices (A) and (B) can be adjusted in a way known in principle by use of suitable reaction conditions (e.g. high reaction temperature and/or polymerization to high conversion as well as optionally addition of substances with cross-linking effect to achieve a high gel content or e.g. low reaction temperature and/or termination of the polymerization before the occurrence of too great a cross-linking as well as optionally addition of molecular weight regulators, as for example n-dodecylmercaptan or t-dodecylmercaptan to achieve a low gel content). The conventional anionic emulsifiers such as alkyl sulphates, alkyl sulphonates, aralkyl sulphonates, soaps of saturated or unsaturated fatty acids as well as alkaline disproportionated or hydrogenated abietic or talloleic acids can be used as emulsifiers; preferably emulsifiers with carboxyl groups (e.g. salts of $C_{10}$–$C_{18}$ fatty acids, disproportionated abietic acid) are used.

The graft polymerization can be carried out by adding the monomer mixture continuously to the mixture of butadiene polymer latices (A) and (B) and polymerizing it.

In the course of this special monomer:rubber ratios and a defined procedure during the addition of the monomer to the rubber latex are preferably maintained.

For the production of the products according to the invention, preferably 25 to 70 parts wt., particularly preferably 30 to 60 parts wt., of a mixture of styrene and acrylonitrile, which optionally can contain up to 50 wt. % (relative to the total amount of monomers used in the graft polymerization) of one or more comonomers, are polymerized in the presence of preferably 30 to 75 parts wt., particularly preferably 40 to 70 parts wt. (in each case relative to solid) of the butadiene polymer latex mixture of (A) and (B).

The monomers used in this graft polymerization are preferably mixtures of styrene and acrylonitrile in the weight ratio 90:10 to 50:50, particularly preferably in the weight ratio 65:35 to 75:25, wherein styrene and/or acrylonitrile can be wholly or partly replaced by copolymerizable monomers, preferably by α-methylstyrene, methyl methacrylate or N-phenylmaleimide.

Molecular weight regulators can be used in addition during the graft polymerization, preferably in amounts of 0.05 to 2 wt. %, particularly preferably in amounts of 0.1 to 1 wt. % (in each case relative to the total monomer mixture in the graft polymerization stage).

Suitable molecular weight regulators are for example n-dodecylmercaptan, t-dodecylmercaptan and dimeric α-methylstyrene.

Possible as initiators are inorganic and organic peroxides, e.g. $H_2O_2$, di-tert-butyl peroxide, cumol hydroperoxide, dicyclohexyl percarbonate, tert-butyl hydroperoxide, p-menthane hydroperoxide, azo initiators as for example azobis(isobutyryl nitrile), inorganic per-salts such as ammonium, sodium or potassium persulphate, potassium perphosphate, sodium perborate as well as redox systems composed of a usually organic oxidizing agent and a reducing agent, wherein heavy-metal ions in addition are present in the reaction medium (see H. Logemann in Houben-Weyl, Methoden der Organischen Chemie, Volume 14/1, p. 263 to 297.

The reaction temperature is 25° C. to 160° C., preferably 40° C. to 90° C. The aforementioned compositions can be used as emulsifiers.

For the production of the products according to the invention the graft polymerization is preferably carried out by monomer feed in such a way that within the first half of the monomer charging time 55 to 90 wt. %, preferably 60 to 80 wt. % and particularly preferably 65 to 75 wt. % of the total monomers to be used in the graft polymerization are charged; the remaining proportion of monomer is charged within the second half of the total monomer charging time.

Finally the graft polymer so produced is mixed with at least one thermoplastic resin. This is possible in various ways. If the thermoplastic resin has itself been produced by emulsion polymerization, the latices can be mixed and precipitated out together and worked up. If the thermoplastic resin has been produced by solution or bulk polymerization, the graft polymer must be isolated by known processes, for example by spray drying or by addition of salts and/or acids, washing of the precipitates and drying of the powder, and subsequently mixed with the thermoplastic resin, which preferably is present in granulate form (preferably on multiroll mills, compounding extruders or internal kneaders); this method is preferably used.

Copolymers of styrene and acrylonitrile in the weight ratio 90:10 to 50:50 preferably are used as vinyl resins, wherein styrene and/or acrylonitrile can be wholly or partly replaced by α-methylstyrene and/or methyl methacrylate; optionally a proportion of up to 30 wt. %, relative to vinyl resin, of another monomer from the series maleic anhydride, maleimide, N-(cyclo)alkylmaleimide, N-(alkyl)phenylmaleimide can be used concomitantly.

Details on the production of these resins are described for example in DE-AS 2 420 358 and DE-AS 2 724 360. Vinyl resins produced by bulk or solution polymerization have particularly proved their worth.

Apart from such thermoplastic resins composed of vinyl monomers, the use of e.g. aromatic polycarbonates, aromatic polyester carbonates, polyesters or polyamides as resin component in the moulding compositions according to the invention is also possible.

Suitable thermoplastic polycarbonates and polyester carbonates are known (cf. e.g. DE-AS 1 495 626, DE-OS 2 232 877, DE-OS 2 703 376, DE-OS 2 714 544, DE-OS 3 000 610, DE-OS 3 832 396, DE-OS 3 077 934), e.g. producible by reaction of diphenols of formulae (I) and (II)

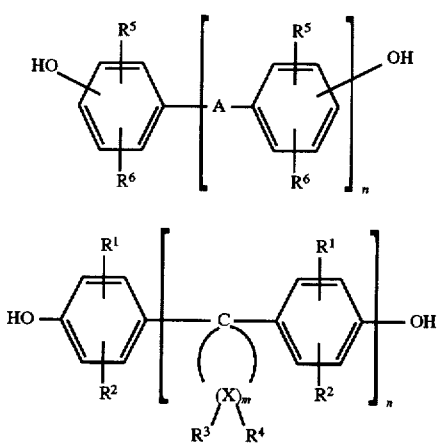

wherein

A is a single bond, $C_1$–$C_5$ alkylene, $C_2$–$C_5$ alkylidene, $C_5$–$C_6$ cycloalkylidene, —O—, —S—, —SO—, —SO$_2$— or —CO—, $R^5$ and $R^6$ independently of each other stand for hydrogen, methyl or halogen, particularly for hydrogen, methyl, chlorine or bromine, $R^1$ and $R^2$ independently of each other represent hydrogen, halogen, preferably chlorine or bromine, $C_1$–$C_8$ alkyl, preferably methyl, ethyl, $C_5$–$C_6$-cycloalkyl, preferably cyclohexyl, $C_6$–$C_{10}$ aryl, preferably phenyl, or $C_7$–$C_{12}$ aralkyl, preferably phenyl-$C_1$–$C_4$ alkyl, particularly benzyl, m is a whole number from 4 to 7, preferably 4 or 5, n is 0 or 1

$R^3$ and $R^4$ can be selected individually for each X and independently of each other represent hydrogen or $C_1$–$C_6$ alkyl and X represents carbon, with carbonic acid halides, preferably phosgene, and/or with aromatic dicarboxylic acid dihalides, preferably benzenedicarboxylic acid dihalides, by the phase boundary process or with phosgene by the process in homogeneous phase (the so-called pyridine process), wherein the molecular weight can be adjusted in the known way by an appropriate amount of known chain terminators.

Suitable diphenols of formulae (I) and (II) are e.g. hydroquinone, resorcinol, 4,4'-dihydroxydiphenyl, 2,2-bis(4-hydroxyphenyl)propane, 2,2-bis(4-hydroxyphenyl)-2-methylbutane, 2,2-bis(4-hydroxy-3,5-dimethylphenyl)propane, 2,2-bis(4-hydroxy-3,5-dichlorophenyl)propane, 2,2-bis(4-hydroxy-3,5-dibromophenyl)propane, 1,1-bis(4-hydroxyphenyl)cyclohexane, 1,1-bis(4-hydroxyphenyl)-3,3,5-trimethylcyclohexane, 1,1-bis(4-hydroxyphenyl)-3,3-dimethylcyclohexane, 1,1-bis(4-hydroxyphenyl)-3,3,5,5-tetramethylcyclohexane or 1,1-bis(4-hydroxyphenyl)-2,4,4-trimethylcyclopentane.

Preferred diphenols of formula (I) are 2,2-bis(4-hydroxyphenyl)propane and 1,1-bis(4-hydroxyphenyl)cyclohexane; the preferred phenol of formula (II) is 1,1-bis(4-hydroxyphenyl)-3,3,5-trimethylcyclohexane.

Mixtures of diphenols also can be used.

Suitable chain terminators are e.g. phenol, p-tert-butylphenol, long-chain alkylphenols such as 4-(1,3-tetramethyl-butyl)phenol according to DE-OS 2 842 005, monoalkylphenols, dialkylphenols with a total of 8 to 20 C atoms in the alkyl substituents according to DE-OS 3 506 472, such as p-nonylphenol, 2,5-di-tert-butylphenol, p-tert-octylphenol, p-dodecylphenol, 2-(3,5-dimethylphenyl)phenol and 4-(3,5-dimethylheptyl)phenol. The required amount of chain terminators is in general 0.5 to 10 mol %, relative to the sum of the diphenols (I) and (II).

The suitable polycarbonates or polyester carbonates can be linear or branched; branched products are preferably obtained by the incorporation of 0.05 to 2.0 mol %, relative to the sum of the diphenols used, of tri- or more than tri-functional compositions, e.g. those with three or more than three phenolic OH groups.

The suitable polycarbonates or polyester carbonates can contain aromatically combined halogen, preferably bromine and/or chlorine; preferably they are halogen-free.

They have average molecular weights ($\overline{M}_w$, weight-average) determined e.g. by ultracentrifugation or light scattering measurement of 10,000 to 200,000, preferably of 20,000 to 80,000.

Suitable thermoplastic polyesters are preferably polyalkylene terephthalates, that is reaction products from aromatic dicarboxylic acids or their reactive derivatives (e.g. dimethyl esters or anhydrides) and aliphatic, cycloaliphatic or arylaliphatic diols and mixtures of such reaction products.

Preferred polyalkylene terephthalates can be produced by known methods from terephthalic acids (or their reactive derivatives) and aliphatic or cycloaliphatic diols with 2 to 10 carbon atoms (Kunststoff-Handbuch, Volume VIII, page 695 ff, Carl Hanser Verlag, München 1973).

In preferred polyalkylene terephthalates 80 to 100, preferably 90 to 100 mol % of the dicarboxylic acid radicals are terephthalic acid radicals and 80 to 100, preferably 90 to 100 mol % of the diol radicals are ethylene glycol and/or 1,4-butanediol radicals.

The preferred polyalkylene terephthalates can contain, in addition to ethylene glycol or 1,4-butanediol radicals, 0 to 20 mol % of radicals of other aliphatic diols with 3 to 12 C atoms or cycloaliphatic diols with 6 to 12 C atoms, e.g. radicals of 1,3-propanediol, 2-ethyl1,3-propanediol, neopentyl glycol, 1,5-pentanediol, 1,6-hexanediol, cyclohexane-1,4-dimethanol, 3-methyl-1,3-pentanediol and 3-methyl-1,6-pentanediol, 2-ethyl-1,3-hexanediol, 2,2-diethyl1,3-propanediol, 2,5-hexanediol, 1,4-di(6-hydroxyethoxy)benzene,2,2-bis(4-hydroxycyclohexyl)propane, 2,4-dihydroxy-1,1,3,3-tetramethylcyclobutane, 2,2-bis(3,6-hydroxyethoxyphenyl)propane and 2,2-bis-(4-hydroxypropoxyphenyl)propane (DE-OS 2 407 647, 2 407 776, 2 715 932).

The polyalkylene terephthalates can be branched by incorporation of relatively small amounts of 3- or 4-hydric alcohols or 3- or 4-basic carboxylic acids, as described in DE-OS 1 900 270 and U.S. Pat. No. 3,692,744. Examples of preferred branching agents are trimesic acid, trimellitic acid, trimethylolethane and -propane and pentaerythritol. It is advisable not to use more than 1 mol % of the branching agent, relative to the acid component.

Particularly preferred are polyalkylene terephthalates which have been produced from terephthalic acid and its reactive derivatives (e.g. its dialkyl esters) and ethylene glycol and/or 1,4-butanediol alone and mixtures of these polyalkylene terephthalates.

Preferred polyalkylene terephthalates also are copolyesters which are produced from at least two of the aforementioned alcohol components: particularly preferred polyesters are poly(ethylene glycol 1,4-butanediol) terephthalates.

The preferably suitable polyalkylene terephthalates have in general an intrinsic viscosity of 0.4 to 1.5 dl/g, preferably 0.5 to 1.3 dl/g, particularly 0.6 to 1.2 dl/g, measured in each case in phenol/o-dichlorobenzene (1:1 parts by wt.) at 25° C.

Suitable polyamides are known homopolyamides, copolyamides and mixtures of these polyamides. These can be partially crystalline and/or amorphous polyamides.

Suitable as partially crystalline polyamides are polyamide-6, polyamide-6,6 mixtures and corresponding copolymers of these components. Possible, furthermore, are partially crystalline polyamides whose acid component consists wholly or partly of terephthalic acid and/or isophthalic acid and/or suberic acid and/or sebacic acid and/or azelaic acid and/or adipic acid and/or cyclohexanedicarboxylic acid, the diamine component of which consists wholly or partly of m- and/or p-xylylenediamine and/or hexamethylenediamine and/or 2,2,4-trimethylhexamethylenediamine and/or 2,4,4-trimethylhexamethylenediamine and/or isophoronediamine and the composition of which is in principle known.

Polyamides also may be mentioned that are produced wholly or partly from lactams with 7 to 12 C atoms in the ring, optionally with concomitant use of one or more of the aforementioned starting components.

Particularly preferred partially crystalline polyamides are polyamide-6 and polyamide-6,6 and their mixtures. Known products can be used as amorphous polyamides. They are obtained by polycondensation of diamines such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexylmethane, 3-aminomethyl-3,5,5-trimethylcyclohexylamine, 2,5- and/or 2,6-bis (aminomethyl)-norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Copolymers that have been obtained by polycondensation of several monomers also are suitable, and furthermore copolymers which are produced with the addition of aminocarboxylic acids such as ε-aminohexanoic acid, ω-aminoundecanoic acid or ω-aminolauric acid or their lactams.

Particularly suitable amorphous polyamides are the polyamides produced from isophthalic acid, hexamethylene diamine and other diamines such as 4,4'-diaminodicyclohexylmethane, isophoronediamine, 2,2,4- and/or 2,4,4-trimethylhexamethylenediamine, 2,5- and/or 2,6-bis(aminomethyl)norbornene; or from isophthalic acid, 4,4'-diaminodicyclohexylmethane and ε-caprolactam; or from isophthalic acid, 3,3'-dimethyl-4,4'-diaminodicyclohexylmethane and lauryl lactam; or from terephthalic acid and the isomer mixture of 2,2,4- and/or 2,4,4-trimethylhexamethylenediamine.

Instead of pure 4,4'-diaminodicyclohexylmethane, mixtures of the position-isomeric diaminodicyclohexylmethanes can be used that have the composition 70 to 99 mol % of the 4,4'-diamino isomers 1 to 30 mol % of the 2,4'-diamino isomers 0 to 2 mol % of the 2,2'-diamino isomers and optionally correspondingly higher-condensed diamines which are obtained by hydrogenation of diaminodiphenylmethane of technical quality. Up to 30% of the isophthalic acid can be replaced by terephthalic acid.

The polyamides preferably have a relative viscosity (measured on a 1 wt. % solution in m-cresol at 25° C.) of 2.0 to 5.0, particularly preferably of 2.5 to 4.0.

The proportion of the graft rubber in the moulding compositions according to the invention can vary within wide limits; it preferably amounts to 10 to 80 wt. %, particularly preferably 20 to 75 wt. %.

Necessary or useful additives, e.g. antioxidants, UV stabilizers, peroxide destroyers, antistatic agents, lubricants, mould release agents, flameproofing agents, filling or reinforcing materials (glass fibres, carbon fibres etc.) and colourants can be added to the moulding compositions according to the invention during production, working-up, further processing and final forming.

The final forming can be undertaken on customary commercial processing plants and comprises e.g. injection moulding processing, sheet extrusion with optionally subsequent heated compression moulding, cold forming, extrusion of tubes and profiles, calender processing.

In the following examples, the quoted parts are always parts by weight and the quoted % is always % by weight if nothing to the contrary is indicated.

EXAMPLES

Example 1

8 parts wt. (calculated as solid) of an anionically emulsified polybutadiene latex produced by radical polymerization (Latex A) with a $d_{50}$ value of 277 nm, a $d_{90}$–$d_{10}$ value of 44 nm and a gel content of 58 wt. % and 50 parts wt. (calculated as solid) of an anionically emulsified polybutadiene latex produced by radical polymerization (Latex B) with a $d_{50}$ value of 415 nm, a $d_{90}$–$d_{10}$ value of 144 nm and a gel content of 83 wt. % are brought with water to a solids content of about 20%, whereafter the mixture is heated to 63° C. and 0.5 parts wt. of potassium peroxodisulphate (dissolved in water) are added. Thereafter 42 parts wt. of a mixture of 73 wt. % styrene and 27% acrylonitrile and 0.1 parts wt. of tert-dodecylmercaptan are charged uniformly over 4 hours; in parallel thereto 1 part by weight (calculated as solid matter) of the sodium salt of an oleoresin acid mixture (Dresinate 731, dissolved in alkalized water) are charged over 4 hours. After a 4-hour post-reaction time, the graft latex, after addition of about 1.0 parts wt. of a phenolic antioxidant, is coagulated with a magnesium sulphate/acetic acid mixture and after washing with water, the resulting powder is dried at 70° C. in vacuum.

35 parts wt. of this graft polymer are mixed with 65 parts wt. of a styrene/acrylonitrile copolymer resin (72:28, $\overline{M}_w$=115,000, $\overline{M}_w/\overline{M}_n$–1≤2), 2 parts wt. ethylenediaminebisstearylamide, 0.1 parts wt. of a silicone oil and 1.28 parts wt. of a colouring mixture (anthracite) are mixed in an internal kneader and thereafter processed to test rods and a special sheet with ribs (for the evaluation of the colour intensification) and a flat sheet (for the evaluation of the surface gloss).

The following data were determined:

Notch impact resistance at room temperature ($a_k^{RT}$) and at −40° C.($a_k^{-40° \ C.}$) according to ISO 180/1A (unit: KJ/m²), ball indentation hardness ($H_c$) according to DIN 53 456 (unit: N/mm²), temperature of deformation under flexural load (Vicat B) according to DIN 53 460 (unit: ° C.), surface gloss according to DIN 67 530 at a reflection angle of 20° (reflectometer value), flowability MVI according to DIN 53 735U (unit:cm³/10 min); the colour intensification was judged visually according to the following gradation:

1 =very weak to not recognizable

2 =weak

3 =moderate

4 =strong

5 =very strong

The results are assembled in Table 1.

Example 2

14.5 parts wt. (calculated as solid) of the Latex A used in Example 1 and 43.5 parts wt. (calculated as solid) of the Latex B used in Example 1 are brought with water to a solids content of about 20 wt. %, whereupon the mixture is heated to 63° C. and 0.5 parts wt. potassium peroxodisulphate (dissolved in acid) are added. Thereafter 42 parts wt. of a mixture of 73 wt. % styrene and 27 wt. % acrylonitrile and 0.1 parts wt. tert-dodecylmercaptan are added within 4 hours in such a way that within the first 2 hours 70 wt. % of the total amount of monomers is charged to the reaction mixture; in parallel thereto, 1 part wt. (calculated as solid matter) of the sodium salt of an oleoresin acid mixture (Dresinate 731, dissolved in alkalized water) is charged over 4 hours. After a 4-hour post-reaction time the graft latex after addition of about 1.0 parts wt. of a phenolic antioxidant is coagulated with a magnesium sulphate/acetic acid mixture and after washing with water the resulting powder is dried at 70° C. in vacuum.

After mixing with styrene/acrylonitrile copolymer resin and additives, the testing was carried out analogously to Example 1.

Example 3

29 parts wt. (calculated as solid matter) of an anionically emulsfied polybutadiene latex produced by radical polymerization with a $d_{50}$ value of 282 nm, a $d_{90}-d_{10}$ value of 48 nm and a gel content of 49 wt. % and 29 parts wt. (calculated as solid matter) of an anionically emulsfied polybutadiene latex produced by radical polymerization with a $d_{50}$ value of 432 nm, a $d_{90}-d_{10}$ value of 128 nm and a gel content of 81 wt. % are brought with water to a solids content of ca. 20 wt. %, whereupon the mixture is heated to 63° C. and 0.5 parts wt. potassium peroxodisulphate (dissolved in water) are added. Thereafter 42 parts wt. of a mixture of 73 wt. % styrene and 27 wt. % acrylonitrile and 0.1 parts wt. tert-dodecylmercaptan are added within 4 hours in such a way that within the first 2 hours 70 wt. % of the total amount of monomers are charged to the reaction mixture; in parallel thereto, 1 part wt. (calculated as solid matter) of the sodium salt of an oleoresin acid mixture (Dresinate 731, dissolved in alkalized water) are charged over 4 hours. After a 4-hour post-reaction time the graft latex after addition of about 1.0 parts wt. of a phenolic antioxidant is coagulated with a magnesium sulphate/acetic acid mixture and after washing with water the resulting powder is dried at 70° C. in vacuum.

After mixing with styrene/acrylonitrile copolymer resin and additives, the testing was carried out analogously to Example 1.

Example 4 (comparative)

Example 2 is repeated, 58 parts wt. Latex A being used instead of the polybutadiene latex mixture. The other reaction conditions as well as working-up and mixing with styrene/acrylonitrile copolymer resin and additives remain unchanged.

Example 5 (comparative)

Example 2 is repeated, 58 parts wt. Latex B being used instead of the polybutadiene latex mixture. The other reaction conditions as well as working-up and mixing with styrene/acrylonitrile copolymer resin remain unchanged.

From the test values assembled in Table 1 it is evident that only the moulding compositions according to the invention have a combination of high toughness, good surface gloss and only very weakly pronounced colour intensification.

It is important also that the values for the other technologically important ABS properties, such as hardness, temperature of deformation under flexural load and particularly thermoplastic flowability as a measure of the processibility are not influenced adversely.

TABLE 1

Test data of the moulding compositions examined

| Example | $a_k$RT (KJ/m$^2$) | $a_k^{-40°\,C.}$ (KJ/m$^2$) | $H_c$ (N/mm$^2$) | Vicat B (°C.) | MVI (cm$^3$/10 min) | Degree of gloss | Colour intensification |
|---|---|---|---|---|---|---|---|
| 1 | 32 | 13 | 90 | 100 | 9.3 | 89 | 1 |
| 2 | 29 | 11 | 91 | 101 | 9.1 | 90 | 1 |
| 3 | 34 | 16 | 90 | 100 | 8.9 | 91 | 2 |
| 4 (comparative) | 21 | 16 | 90 | 100 | 9.3 | 92 | 5 |
| 5 (comparative) | 27 | 9 | 92 | 101 | 9.3 | 84 | 2 |

We claim:

1. Thermoplastic moulding compositions of the ABS type comprising:

I) at least one graft copolymer which is obtained by emulsion polymerization of styrene and acrylonitrile in the weight ratio 90:10 to 50:50, wherein styrene and/or acrylonitrile can be completely or partly replaced by α-methylstyrene, methyl methacrylate or N-phenylmaleimide, in the presence of at least two butadiene polymer latices of types (A) and (B), which each contain, copolymerized, 0 to 50 wt. % of a further vinyl monomer, and wherein the weight ratio of monomers used to butadiene polymers used is 25:75 to 70:30, and (II) at least one copolymer of styrene and acrylonitrile in the weight ratio 90:10 to 50:50, wherein the styrene and/or acrylonitrile can be completely or partly replaced by α-methylstyrene, methyl methacrylate or N-phenylmaleimide, characterized in that the butadiene polymer latex (A) has a particle diameter $d_{50} \leq 320$ nm, a width of the particle size distribution (measured as $d_{90}-d_{10}$ from the integral particle size distribution) of 30 to 100 nm, and a gel content of 40 to 70 wt. % and the butadiene polymer latex (B) has a particle diameter $d_{50} \geq 370$ nm, a width of the particle size distribution (measured as $d_{90}-d_{10}$ from the integral particle size distribution) of 50 to 500 nm and a gel content $\geq 70$ wt. %.

2. Thermoplastic moulding compositions of the ABS type according to claim 1, wherein the graft polymerization is carried out by monomer feed to the mixture of the butadiene polymer latices (A) and (B) in such a way that within the first half of the monomer feed time 55 to 90 wt. % of the monomers are charged.

3. Thermoplastic moulding compositions according to claim 1, wherein

I) at least one graft copolymer which is obtainable by emulsion polymerization of styrene and acrylonitrile in the weight ratio of 90:10 to 50:50, wherein styrene and/or acrylonitrile can be completely or partly replaced by α-methylstyrene, methyl methacrylate or N-phenylmaleimide, in the presence of at least two butadiene polymer latices of types (A) and (B), which each contain, copolymerized, 0 to 50 wt. % of a further vinyl monomer, and wherein the weight ratio of monomers used to butadiene polymers used is 25:75 to 70:30, and (II) at least one copolymer of styrene and acrylonitrile in the weight ratio 90:10 to 50:50, wherein the styrene and/or acrylonitrile can be completely or partly replaced by α-methylstyrene, methyl methacrylate or N-phenylmaleimide, characterized in that]the butadiene polymer latex (A) has a particle diameter $d_{50}$ of 260 to 310 nm, a width of the particle size distribution (measured as $d_{90}-d_{10}$ from the integral particle size distribution) of 40 to 80 nm, and a gel content of 40 to 65 wt. % and the butadiene polymer latex (B) has a particle diameter of 380 to 450 nm, a width of the particle size distribution (measured as $d_{90}-d_{10}$ from the integral particle size distribution) of 100 to 400 nm and a gel content of 75 to 90 wt. %.

4. Thermoplastic moulding compositions of the ABS type according to claim 3, wherein the graft polymerization is carried out by monomer feed to the mixture of the butadiene polymer latices (A) and (B) in such a way that within the first half of the monomer feed time 60 to 80 wt. % of the monomers are charged.

5. A method of using the thermoplastic moulding compositions according to claim 1, comprising the step of moulding said compositions to form moulded articles.

6. Thermoplastic moulding compositions according to claim 1, wherein butadiene polymer latex (A) has a particle diameter $d_{50}$ of about 277 nm, a width of the particle size distribution (measured as $d_{90}-d_{10}$ from the integral particle size distribution) of about 44 nm, and a gel content of about 58% and the butadiene polymer latex (B) has a particle diameter $d_{50}$ of about 415 nm, a width of the particle size distribution (measured as $d_{90}-d_{10}$ from the integral particle size distribution) of about 144 nm and a gel content of about 83 wt. %.

7. Thermoplastic moulding compositions according to claim 1, wherein butadiene polymer latex (A) has a particle diameter $d_{50}$ of about 282 nm, a width of the particle size distribution (measured as $d_{90}-d_{10}$ from the integral particle size distribution) of about 48 nm, and a gel content of about 49 wt. % and the butadiene polymer latex (B) has a particle diameter $d_{50}$ of about 432 nm, a width of the particle size distribution (measured as $d_{90}-d_{10}$ from the integral particle size distribution) of about 128 nm and a gel content of about 81 wt. %.

8. Thermoplastic moulding compositions according to claim 1, wherein the gel content of latex (B) is $\geq 81$ wt. %.

9. Thermoplastic moulding compositions according to claim 1, wherein the gel content of latex (B) is $\geq 83$ wt. %.

10. Thermoplastic moulding compositions according to claim 1, wherein the gel content of latex (A) is from 40–58 wt. %.

11. Thermoplastic moulding compositions according to claim 1, wherein the gel content of latex (A) is from 40–49 wt. %.

12. Thermoplastic moulding compositions of the ABS type consisting essentially of:

I) at least one graft copolymer which is obtained by emulsion polymerization of styrene and acrylonitrile in the weight ratio 90:10 to 50:50, wherein styrene and/or acrylonitrile can be completely or partly replaced by α-methylstyrene, methyl methacrylate or N-phenylmaleimide, in the presence of at least two butadiene polymer latices of types (A) and (B), which each contain, copolymerized, 0 to 50 wt. % of a further vinyl monomer, and wherein the weight ratio of monomers used to butadiene polymers used is 25:75 to 70:30, and (II) at least one copolymer of styrene and acrylonitrile in the weight ratio 90:10 to 50:50, wherein the styrene and/or acrylonitrile can be completely or partly replaced by α-methylstyrene, methyl methacrylate or N-phenylmaleimide, characterized in that the butadiene polymer latex (A) has a particle diameter $d_{50} \leq 320$ nm, a width of the particle size distribution (measured as $d_{90}-d_{10}$ from the integral particle size distribution) of 30 to 100 nm, and a gel content of 40 to 70 wt. % and the butadiene polymer latex (B) has a particle diameter $d_{50} \geq 370$ nm, a width of the particle size distribution (measured as $d_{90}-d_{10}$ from the integral particle size distribution) of 50 to 500 nm and a gel content $\geq 70$ wt. %.

13. Thermoplastic moulding compositions according to claim 12, wherein the butadiene polymer latex (A) has a particle diameter $d_{50}$ of 260 to 310 nm, a width of the particle size distribution (measured as $d_{90}-d_{10}$ from the integral particle size distribution) of 40 to 80 nm, and a gel content of 40 to 65 wt. % and the butadiene polymer latex (B) has a particle diameter of 380 to 450 nm, a width of the particle size distribution (measured as $d_{90}-d_{10}$ from the integral particle size distribution) of 100 to 400 nm and a gel content of 75 to 90 wt. %.

\* \* \* \* \*

UNITED STATES PATENT AND TRADEMARK OFFICE
CERTIFICATE OF CORRECTION

PATENT NO. : 5,741,853
DATED : April 21, 1998
INVENTOR(S) : Eichenauer et al.

Page 1 of 1

It is certified that error appears in the above-identified patent and that said Letters Patent is hereby corrected as shown below:

Column 11,
Lines 6-20 should be deleted
Line 21, "N-phenylmaleimide, characterized in that" should be deleted.

Claim 3 should read as follows:

--3. Thermoplastic moulding compositions according to claim 1, wherein the butadiene polymer latex (A) has a particle diameter $d_{50}$ of 260 to 310 nm, a width of the particle size distribution (measured as $d_{90}-d_{10}$ from the integral particle size distribution) of 40 to 80 nm, and a gel content of 40 to 65 wt.% and the butadiene polymer latex (B) has a particle diameter of 380 to 450 nm, a width of the particle size distribution (measured as $d_{90}-d_{10}$ from the integral particle size distribution) of 100 to 400 nm and a gel content of 75 to 90 wt.%.--

Signed and Sealed this

Third Day of July, 2001

*Nicholas P. Godici*

Attest:

NICHOLAS P. GODICI
*Acting Director of the United States Patent and Trademark Office*

*Attesting Officer*